(12) United States Patent
Saban et al.

(10) Patent No.: US 6,504,337 B1
(45) Date of Patent: Jan. 7, 2003

(54) MOTOR MODELING USING HARMONIC AMPERE-TURN SATURATION METHOD

(75) Inventors: Daniel M. Saban, Fort Wayne, IN (US); Patrick L. Jansen, Alplaus, NY (US); Charles M. Stevens, Pattersonville, NY (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 09/877,877

(22) Filed: Jun. 8, 2001

(51) Int. Cl.[7] .................................................. H02P 1/24
(52) U.S. Cl. ....................... 318/727; 318/611; 318/638; 318/538; 388/832; 388/805; 388/907.5; 310/51
(58) Field of Search ................................ 318/611, 638, 318/538; 388/832, 805, 907.5; 310/51, 44

(56) References Cited

U.S. PATENT DOCUMENTS 6,191,510 B1 * 2/2001 Landin et al. ................ 310/51

* cited by examiner

Primary Examiner—Karen Masih
(74) Attorney, Agent, or Firm—Welsh & Katz, Ltd.

(57) ABSTRACT

A method and apparatus are provided for modeling an electric motor. The method includes the steps of interpolating a flux density for each angular position within an air gap of the electric motor from a predetermined air gap and tooth magnetization magnetomotive force versus air gap flux density curve, decomposing the interpolated flux density into a set of harmonic components using a fast Fourier transform and determining a flux density error function from the decomposed set of harmonic components.

35 Claims, 13 Drawing Sheets

RADIAL SLOT PATH   TOOTH LAMINATION PATH   INTER-LAMINATION PATH

○ EQUALLY SPACED DATA POINT VIA SPLINE INTERPOLATION

● DATA POINTS AFTER AIR PATH CORRECTION

STATOR TOOTH MMF, A-TURNS $B_g$, TESLA

MOTOR MODELING USING HARMONIC AMPERE-TURN SATURATION METHOD

FIELD OF THE INVENTION

The field of the invention relates electric motors and more particularly to the modeling of electric motors.

BACKGROUND OF THE INVENTION

The modeling of electric motors is not a new concept. However, the main issue in modeling single phase electric motors, as opposed to poly-phase motors, is that the flux in the airgap is not uniform. This gives rise to saturation in different regions of the motor that is decidedly different than other regions. Calculating this level of saturation accurately, especially considering the distortion of the flux waveform was not something that had been attempted in previous models. Assumptions were made (false assumptions) about the symmetry of the motor and the saturation was applied according to those assumptions, which gave erroneous results. Furthermore existing models divided the motor saturation into 4 nodes: stator yoke, stator teeth, rotor yoke, rotor teeth. Accordingly, a need exists for a more reliable method of modeling electric motors.

SUMMARY

A method and apparatus are provided for modeling an electric motor. The method includes the steps of interpolating a flux density for each angular position within an air gap of the electric motor from a predetermined air gap and tooth magnetization magnetomotive force versus air gap flux density curve, decomposing the interpolated flux density into a set of harmonic components using a fast Fourier transform and determining a flux density error function from the decomposed set of harmonic components.

DETAILED DESCRIPTION OF A PREFERRED EMBODIMENT

Figure 1:
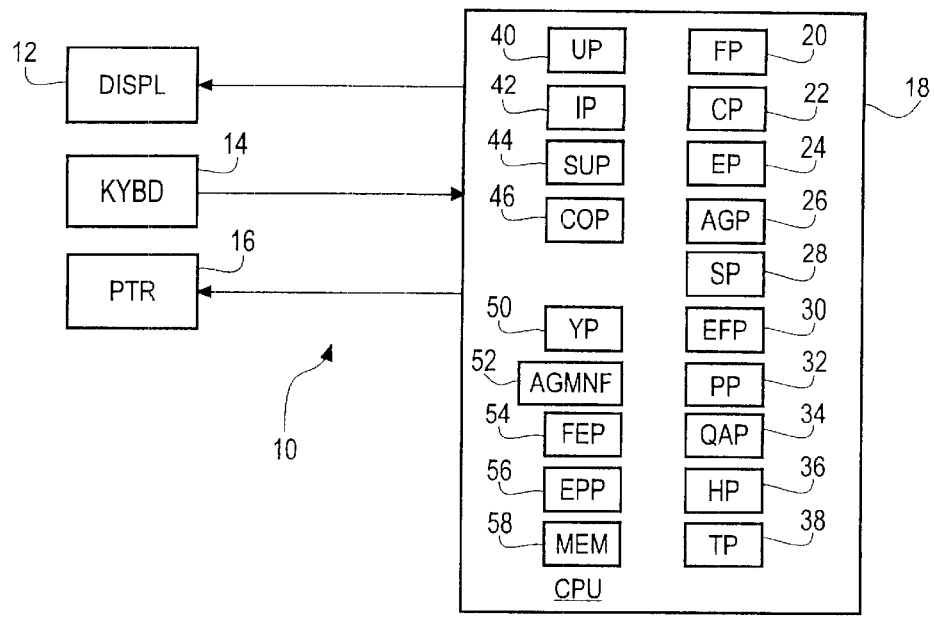
FIG. 1 is block diagram of a electric motor modeling system under an illustrated embodiment of the invention.

FIG. 1 is a block diagram of a modeling system 10 for electric motors. The new system 10 uses calculation procedures that account for the distortion of the flux wave, the asymmetry of motor, and achieves a fundamental advance over prior methods based, in part, upon significantly more calculation nodes: at least one for each yoke and tooth section (usually totals more than 100). The amp-turn technique described herein for calculating magnetizing saturation is comprised of making assignments of flux densities to the various components of the magnetic circuit, followed by calculating the amp-turns necessary to provide the assigned flux densities.

Figure 2:
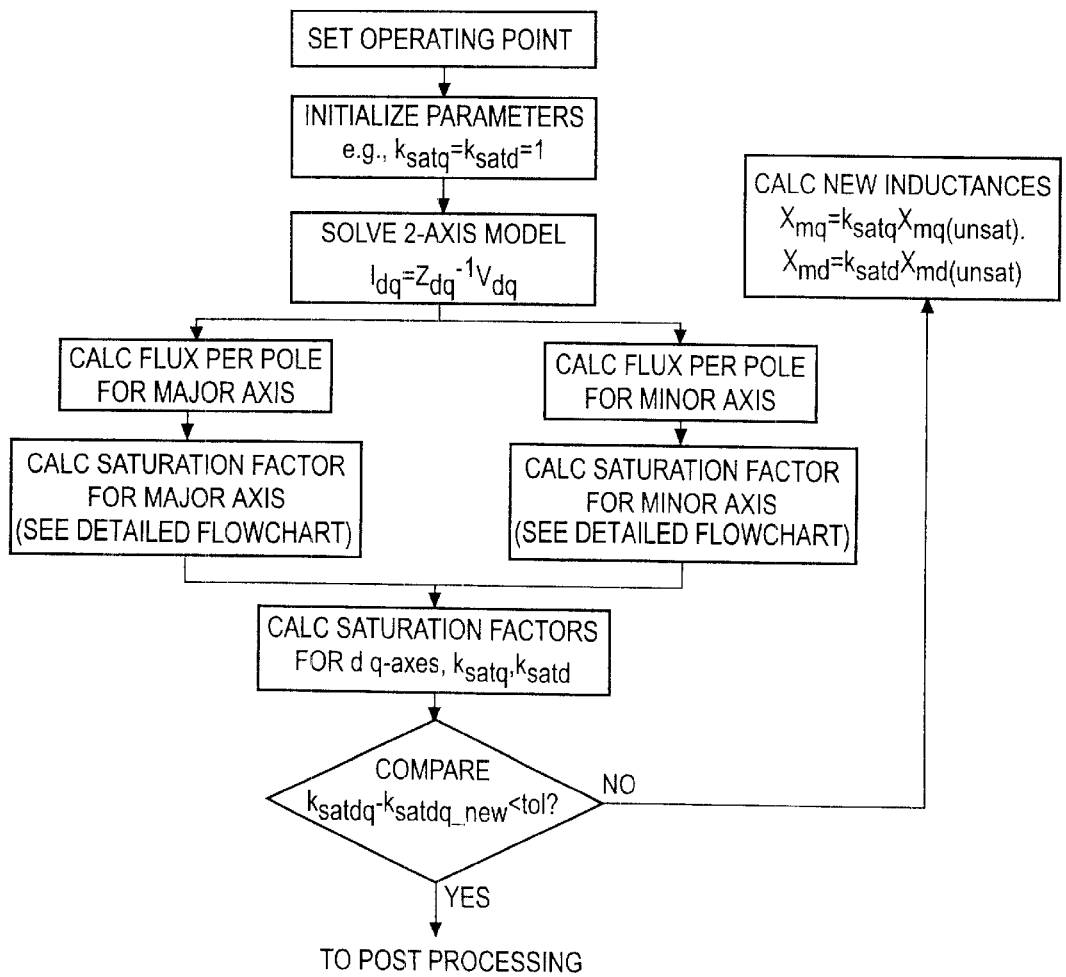
FIG. 2 is a flow chart of a general steady state solution strategy of the harmonic ampere-turn modeling method used by the system of FIG. 1.

The general steady state solution strategy for magnetizing saturation calculation (integrated within the two-axis (dq) motor model) is depicted more fully in the flowchart in FIG. 2. The two-axis model provides magnetizing flux linkages in both the stator d and q-axes for the fundamental and each space harmonic that is modeled. The d and q-axis flux linkages are steady state phasor quantities representing both space and time variations. Through the use of symmetrical component theory, the d, q flux linkages are transformed into forward and backward rotating components, and then into major and minor axis components. From the major and minor axis components, the instantaneous flux per pole is obtained.

Separate saturation factors are calculated for the major and minor axes of the magnetizing flux, and then converted to equivalent stator d and q-axis steady state saturation factors. Saturation factors for both the fundamental as well as any space harmonics included in the induction motor model.

The following nomenclature and abbreviations are used in this document: $\alpha_r$ is phase angle of a rotor forward rotating flux in radians; $\alpha_s$ is phase angle of a stator forward rotating flux in radians; $\beta_r$ is phase angle of rotor backward rotating flux in radians; $\beta_s$ is phase angle of stator backward rotating flux in radians; $\delta$ is airgap length, m; $\hat{\phi}_{dr}$ is rotor flux per pole, d-axis phasor, webers; $\hat{\phi}_{qr}$ is rotor flux per pole, q-axis phasor, webers; $\hat{\phi}_{ds}$ is stator flux per pole, d-axis phasor, webers; $\hat{\phi}_{qs}$ is stator flux per pole, q-axis phasor, webers; $\Phi_r$ is peak rotor flux per pole, over space and time, webers; $\Phi_s$ is peak stator flux per pole, over space and time, webers; $\Phi_{dr}$ is rotor flux per pole amplitude, d-axis, webers; $\Phi_{qr}$ is rotor flux per pole amplitude, q-axis, webers; $\Phi_{ds}$ is stator flux per pole amplitude, d-axis, webers; $\Phi_{qs}$ is stator flux per pole amplitude, q-axis, webers; $\Phi_{br}$ is rotor flux per pole amplitude, backward component, webers; $\Phi_{fr}$ is rotor flux per pole amplitude, forward component, webers; $\Phi_{bs}$ is stator flux per pole amplitude, backward component, webers; $\Phi_{fs}$ is stator flux per pole amplitude, forward component, webers; $\psi_r$ is angle of major axis of rotor flux; characteristic, radians; $\psi_s$ is angle of major axis of stator flux characteristic, radians; $B_g$ is instantaneous air gap flux density spatial distribution, Tesla; $B_{yr}$ is instantaneous rotor yoke flux density spatial distribution, Tesla; $B_{ys}$ is instantaneous stator yoke flux density spatial distribution, Tesla; $d_{ys}$ is average stator yoke depth, m; $d_{yr}$ is average rotor yoke depth, m; $f_{slip}$ is rotor slip frequency, Hz; g is air gap length, m; $g_{eff}$ is air gap length modified via Carter factors, m; h is harmonic number; e.g., h=1→2-pole field, h=2→4-pole field; $H_{max}$ is maximum field intensity, Amp-turns/m; HAT is harmonic ampere-turn (method); $\hat{I}_{dm}$ is magnetizing current, d-axis phasor; $\hat{I}_{dr}$ is rotor current, d-axis phasor, Amps rms and $\hat{I}_{ds}$ is stator current, d-axis phasor, Amps rms.

Flux linkages from a two-Axis model will be considered first. The rms magnetizing flux linkages for each space harmonic h are obtained from the rms stator currents, rotor currents and circuit reactances of the two-axis model as $$\Lambda_{qm_h} = L_{mq_h} I_{qr_h} + I_{qs_h} \tag{2.2.1}$$

$$\Lambda_{dm_h} = L_{md_h} I_{dr_h} + I_{ds_h} \tag{2.2.2}$$

Subharmonics are handled by defining the space harmonic number h relative to the complete machine; that is, h=1 corresponds to a 2-pole filed, whether it is the machine fundamental, or a subharmonic. Similarly, the fundamental field quantities in a 6-pole machine will be designated by h=3; and subharmonics by h=1 and h=2.

Figure 3:
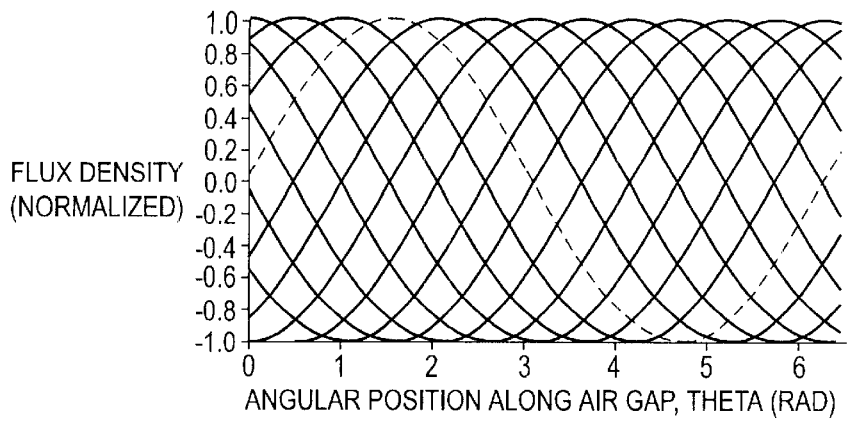
FIG. 3 depicts instantaneous flux density spatial distributions over one electrical cycle in time and space for a balanced polyphase motor.
Figure 4:
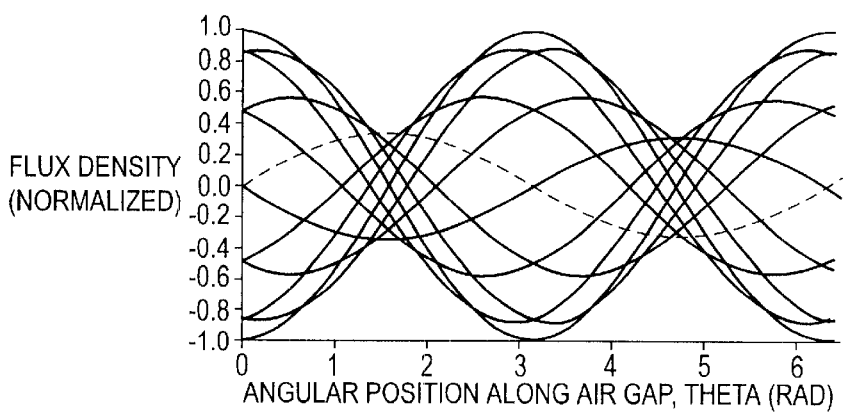
FIG. 4 depicts instantaneous flux density spatial distributions over one electrical cycle in time and space for an unbalanced polyphase operation (forward field equals two times backward field) that may be modeled by the system of FIG. 1.
Figure 5:
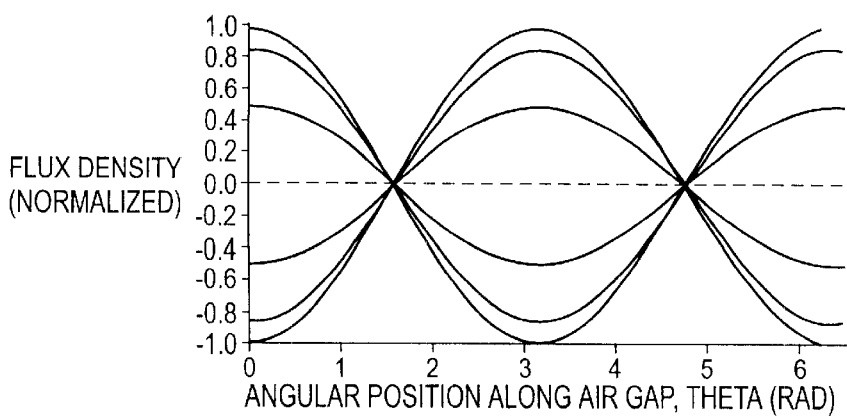
FIG. 5 depicts instantaneous flux density spatial distributions over one electrical cycle in time and space for relatively pure single phase field operation (forward field equals backward field that may be modeled by the system of FIG. 1.

Computation of the flux per pole via symmetrical components will be considered next. FIGS. 3–5 illustrates the fundamental waveforms of the instantaneous air gap flux density for three different types of operation. More specifically, FIGS. 3–5 depict instantaneous flux density spatial distributions over one electrical cycle. FIG. 3 depicts balanced polyphase operation. FIG. 4 depicts unbalanced polyphase operation (i.e., forward field equals two times the backward field), which is typical in single phase motors. FIG. 5 depicts a pure single phase field (i.e., forward field equals backward field).

Under balanced polyphase operation (i.e., balanced excitation and symmetrical windings and laminations), the flux density wave travels in a single direction and is of constant amplitude as shown in FIG. 3. With unbalanced excitation, a counter-rotating component is present that causes the net flux density wave to pulsate as depicted in FIG. 4. This waveform is typical for single-phase motors during run operation. FIG. 5 depicts the extreme case whereby the forward and backward rotating components are of equal amplitude, thereby creating a standing wave. This type of field is atypical of machine operation, and would exist in a single-phase motor only at standstill with a single winding excited only.

Figure 6:
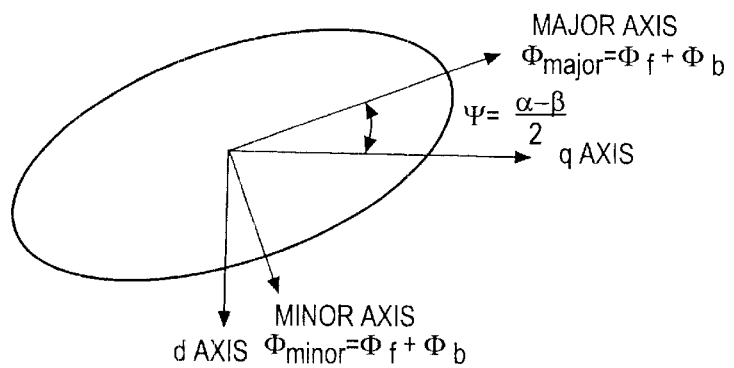
FIG. 6 depicts an elliptical locus of flux caused by unbalanced operation that may b modeled by the system of FIG. 1.

For single-phase motors, the locus of the flux with respect to peripheral location follows an elliptical pattern, having a major axis, a minor axis, and an alignment angle of the ellipse's major axis with respect to the stator q-axis. FIG. 6 illustrates this elliptical locus and, more specifically, illustrates an elliptical locus of flux caused by unbalanced operation (e.g., single-phase motor operation) as defined for each fundamental and harmonic pole number.

The amp-turn technique will be used to define the parameters of the ellipse and then perform two amp-turn calculations, one along the major axis and one along the minor axis. Saturation factors will be calculated for each, and these factors will then be transformed to the stator d and q-axes.

For balanced polyphase motors, the locus of flux follows a circular pattern, and the major and minor axes are equal. Only one amp-turn calculation is required.

The calculation of separate d and q-axis flux per pole phasor quantities for each space harmonic h follows from the previous calculation of magnetizing flux linkages:

$$\varphi_{q_h} = \frac{\sqrt{2}\, \Lambda_{qm_h}}{N_{qs_h} P_h} \tag{2.2.1}$$

$$\varphi_{d_h} = \frac{\sqrt{2}\, \Lambda_{dm_h}}{N_{ds_h} P_h} \tag{2.2.2}$$

where $N_{qs_h}$ is the effective turns per pole, stator q-axis, $N_{ds_h}$ is the effective turns per pole, stator d-axis and $P_h$ is the space harmonic pole number (=2h).

Note, that for a symmetrical polyphase machine, $N_{qs_h} = N_{ds_h}$.

The effective d and q-axis turns per pole are obtained by transforming the physical effective turns per pole to the d-q frame; i.e., $$\begin{matrix} N_{qs_h} \\ N_{ds_h} \end{matrix} = K_{sh} \begin{matrix} N_{s_{1,h}} \\ N_{s_{2,h}} \\ \vdots \\ N_{s_{n,h}} \end{matrix} \tag{2.2.3}$$

where $K_{sh}$ is the 2×n transformation matrix relating the winding components.

The forward and backward rotating symmetrical components of the magnetizing flux per pole are obtained from the d-q magnetizing fluxes per pole in phasor form:

$$\phi_{f_h} = \tfrac{1}{2}\phi_{q_h} - j\phi_{d_h} = \Phi_{f_h} e^{j\alpha_h} \tag{2.2.4}$$

$$\phi_{b_h} = \tfrac{1}{2}\phi_{q_h} - j\phi_d = \Phi_{b_h} e^{j\beta_h} \tag{2.2.5}$$

The maximum flux per pole in space and time is then equal to $$\Phi_{major_h} = \Phi_{f_h} + \Phi_{b_h} \tag{2.2.6}$$

This corresponds to the length of the major axis of the generally "elliptical" flux envelope. Likewise, the minor axis length is then $$\Phi_{minor_{hi}} = \Phi_{f_h} - \Phi_{b_h} \qquad (2.2.7)$$

and the location of the major axis, with respect to the q-axis, is $$\psi_h = \frac{\alpha_h - \beta_h}{2} \qquad (2.2.8)$$

The instantaneous flux per pole reflected back to the stator d and q-axes (as defined for each pole number) at the instant the flux is aligned along the major axis becomes $$\Phi_{q\_major_h} = \Phi_{major_h} \cos \psi_h \text{ and} \qquad (2.2.9)$$

$$\Phi_{d\_major_h} = -\Phi_{major_h} \sin \psi_h \qquad (2.2.10)$$

Likewise, when the flux is aligned along the minor axis, the d and q-axis flux per pole are $$\Phi_{q\_minor_h} = \Phi_{minor_h} \sin \psi_h \qquad (2.2.11)$$

$$\Phi_{d\_minor_h} = \Phi_{minor_h} \cos \psi_h \qquad (2.2.12)$$

Figure 7:
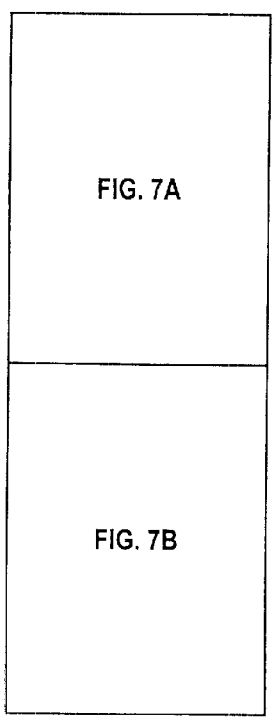
FIGS. 7A–7B is a flow chart depicts steps of the harmonic ampere-turn method used by the system of FIG. 1.
Figure 7A:
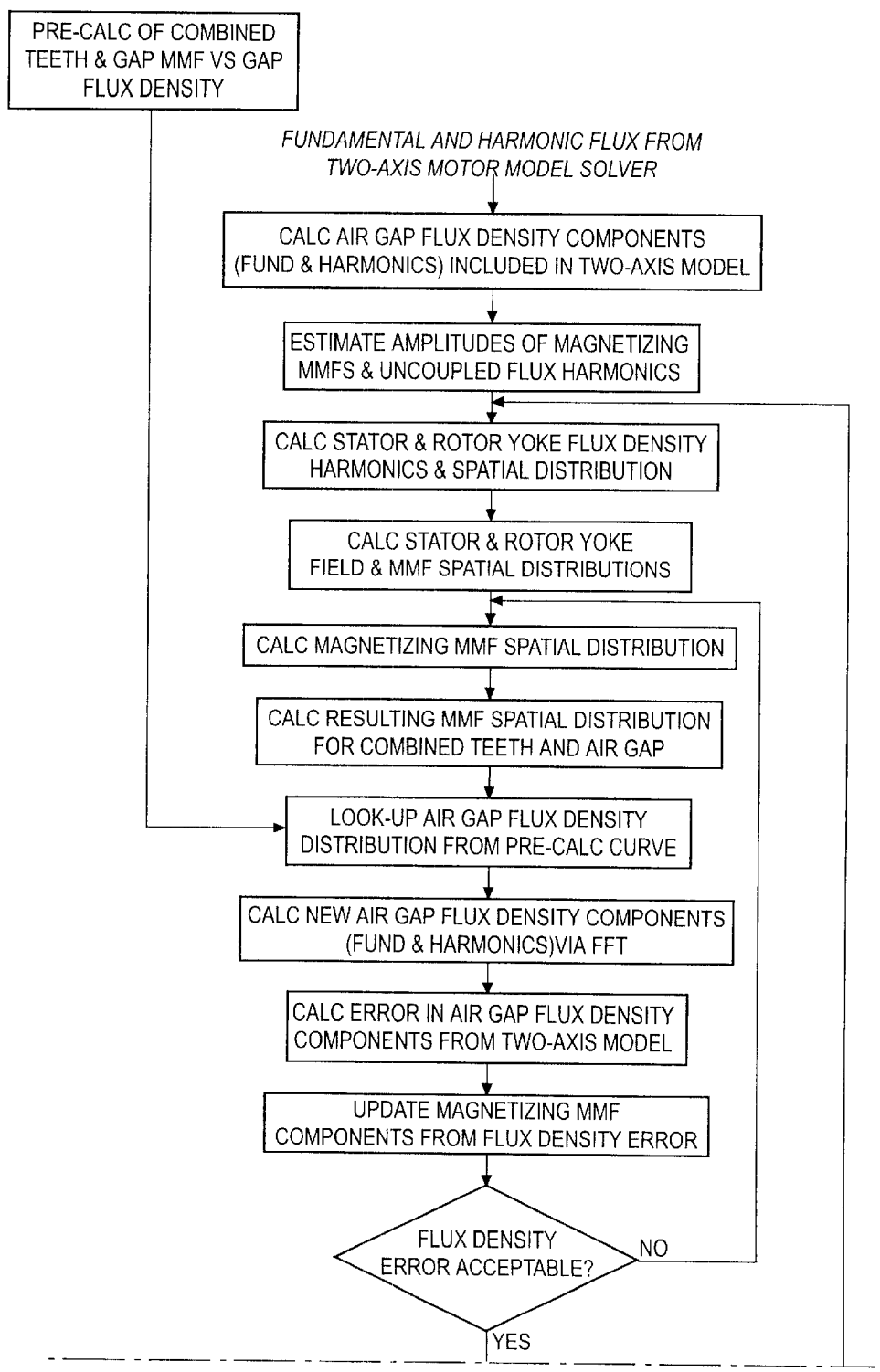
Figure 7B:
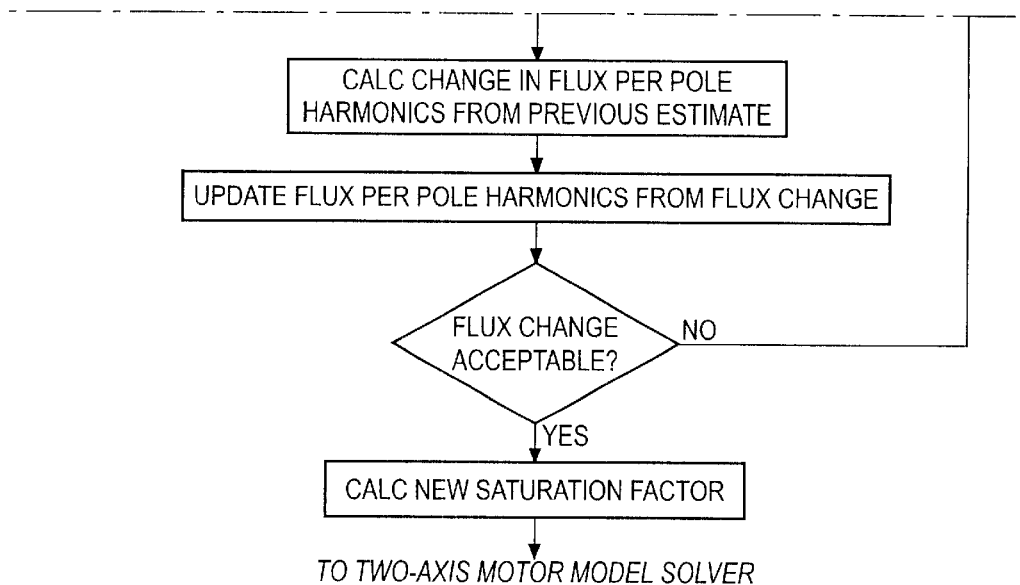

The flux per pole for each harmonic (inc. fundamental) (as calculated in equations 2.2.9–12) form inputs to the harmonic amp-turn (HAT) process as shown by the flowchart in FIG. 7. The following sections describe the procedures outlined in the flowchart in detail.

To apply the HAT method, a through knowledge of the magnetic properties of the motor is important. Accurate characterization and modeling of the magnetic materials in the machines is important for accurate prediction of the magnetizing saturation.

Since the HAT method used by the system 10 calculates the actual instantaneous spatial distributions of flux density and MMF, the DC magnetization curve rather than AC magnetization curves should be used. This is provided that the frequencies are low enough such that the effect of eddy currents within the laminations can be neglected.

The magnetization curves are utilized within the HAT method in the form of B vs H via cubic spline interpolation. The B-H curves can be entered and stored in memory 58 as either raw tabular B-H data or directly as cubic spline coefficients.

The space between laminations that constitutes the lamination stacking factor is regarded as an additional flux path in parallel with the lamination steel. The effective permeability of the inter-laminar space is considered the same as that of air. Thus for a stack of laminations including inter-laminar space, the effective B-H is calculated from the steel/iron $B_{Fe}$-H curve according to:

$$B = B_{fe} k_{stack} + \mu_o H (1 - k_{stack}) \qquad (2.3.3.1)$$

Note that the true stack length, rather than an effective magnetic stack length calculated from a stacking factor, is then used by the system 10 throughout process of the HAT method.

As shown by the flowchart in FIG. 7, the HAT Method requires the pre-calculation of curves relating net stator and rotor tooth and air gap MMFs as a function of air gap flux density. The pre-calculation may be performed by any known method and is followed by the storing of the curves in memory 58.

Figure 8:
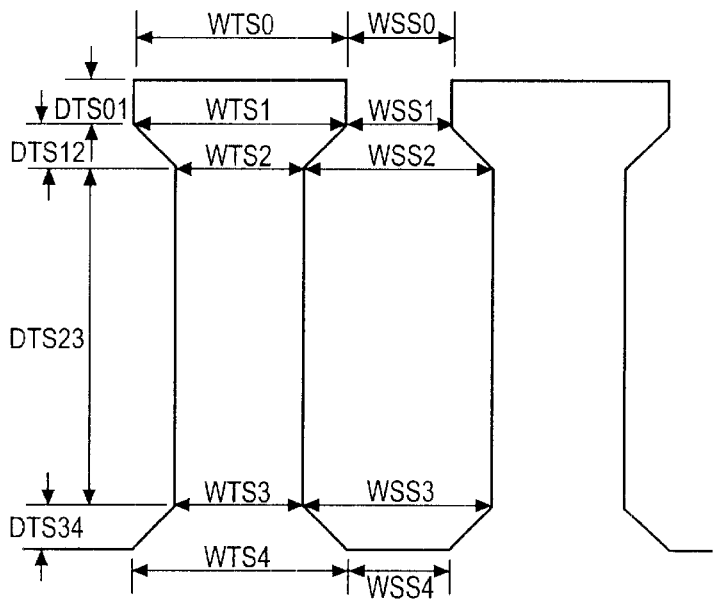
FIG. 8 depicts a typical stator tooth and slot geometry with dimensioning that may be modeled by the system of FIG. 1.
Figure 9:
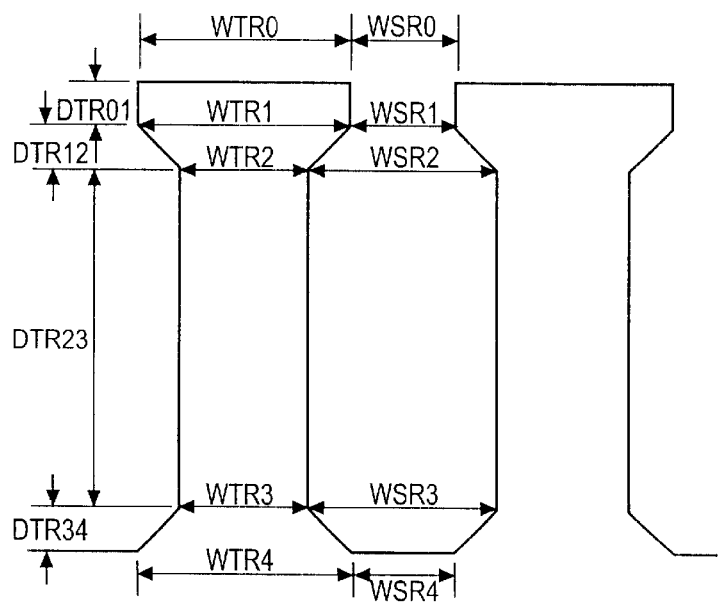
FIG. 9 depicts a typical rotor tooth and slot geometry with dimensioning that may be modeled by the system of FIG. 1.

FIGS. 8 and 9 define the geometry and dimensioning used to describe the stator and rotor teeth and slots. FIG. 8 depicts typical stator tooth and slot geometry with dimensioning conventions. FIG. 9 depicts typical rotor tooth and slot geometry with dimensioning conventions. Closed rotor slots are handled by setting wsr0=wsr1=0. More complex tooth and slot shapes such as asymmetrical double-cage rotor slots are considered in later paragraphs.

A non-iterative method of correcting for radial slot flux with be considered first. For a given air gap flux density, the MMF drop across the air gap is simply $$MMF_g = \frac{g_{eff}}{\mu_0} B_g. \qquad (2.4.2.1)$$

Where the effective gap is the actual air gap length corrected by Carter factors for the stator and rotor slotting, then $$g_{eff} = k_{c1} k_{c2} g \qquad (2.4.2.2)$$

The Carter factor for stator slots is:

$$k_{c1} = \frac{\tau_{ss0}}{\tau_{ss0} - \frac{2}{\pi} w_{xx0} \tan^{-1} \frac{w_{ss0}}{2g} - \frac{g}{w_{ss0}} \ln 1 + \frac{w_{ss0}}{2g}^2}. \qquad (2.4.2.3)$$

For semi-closed rotor slots, the Carter factor is:

$$k_{c2} = \frac{\tau_{sr0}}{\tau_{sr0} - \frac{2}{\pi} w_{xr0} \tan^{-1} \frac{w_{sr0}}{2g} - \frac{g}{w_{sr0}} \ln 1 + \frac{w_{sr0}}{2g}^2}. \qquad (2.4.2.4a)$$

For closed rotor slots, the Carter factor is simply set to unit; i.e., $$k_{c2} = 1 \qquad (2.4.2.4b)$$

Figure 10:
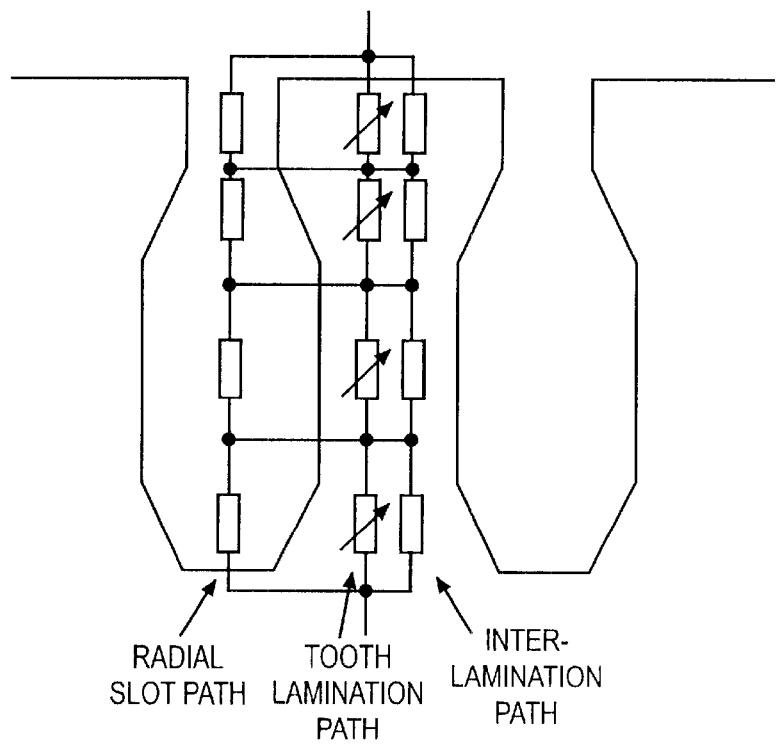
FIG. 10 depicts flux paths for a stator tooth and slot that may be modeled by the system of FIG. 1.

Stator teeth magnetomotive force (MMF) will be considered next. The MMF drop across the stator and rotor teeth are calculated assuming the magnetic circuit shown in FIG. 10. The net flux per tooth and slot is divided into parallel flux path components of tooth iron, radial slot, and inter-lamination air space flux. Since the inter-lamination air space flux is already included in the modified B-H curve (as described in later sections), only the radial slot flux path requires additional consideration. The flux at the air gap over one slot pitch becomes $$\phi_{gap} = \phi_{tooth} + \phi_{slot} + \phi_{lam\_space} \qquad (2.4.2.5)$$

With the inter-lamination flux already included in the magnetization curves, the gap flux can be written $$\phi_{gap} = \phi_{tooth} + \phi_{slot} \qquad (2.4.2.6)$$

The flux paths for stator tooth and slot will be considered next. Neglecting the radial slot, for a given initial air gap flux density, the flux density in the facing stator tooth at the gap surface (tooth face)-can be described by the expression as follows:

$$B_{ts0} = \frac{\tau_{ss0}}{w_{ts0}} B_{gi} \qquad (2.4.2.7a)$$

This assumes all air gap flux is confined to the stator tooth lamination; i.e., no flux is flowing radially through the slots. The flux densities at defined positions along the tooth are similarly calculated:

$$B_{ts1} = \frac{\tau_{ss0}}{w_{ts1}} B_{gi} \quad (2.4.2.7b)$$

$$B_{ts2} = \frac{\tau_{ss0}}{w_{ts2}} B_{gi} \quad (2.4.2.7c)$$

$$B_{ts3} = \frac{\tau_{ss0}}{w_{ts3}} B_{gi} \quad (2.4.2.7d)$$

$$B_{ts4} = \frac{\tau_{ss0}}{w_{ts4}} B_{gi} \quad (2.4.2.7e)$$

For more complex tooth geometries as in FIG. 9, additional positions along the tooth may be defined.

From the stator lamination magnetization (B-H) curve, the corresponding initial field intensities are calculated for the above tooth flux densities as follows;

$$H_{ts0i} = f_{BH_{stator}}(B_{ts0}) \quad (2.4.2.8a)$$

$$H_{ts1i} = f_{BH_{stator}}(B_{ts1}) \quad (2.4.2.8b)$$

$$H_{ts2i} = f_{BH_{stator}}(B_{ts2}) \quad (2.4.2.8c)$$

$$H_{ts3i} = f_{BH_{stator}}(B_{ts3}) \quad (2.4.2.8d)$$

$$H_{ts4i} = f_{BH_{stator}}(B_{ts4}) \quad (2.4.2.8e)$$

Note that separate B-H curves can be used for the stator and rotor teeth.

A correction for radial slot flux may also be made. From the tooth field intensities, the corresponding radial components of flux densities in the adjacent slots are simply:

$$B_{ss0} = \mu_o H_{ts0i} \quad (2.4.2.9a)$$

$$B_{ss1} = \mu_o H_{ts1i} \quad (2.4.2.9b)$$

$$B_{ss2} = \mu_o H_{ts2i} \quad (2.4.2.9c)$$

$$B_{ss3} = \mu_o H_{ts3i} \quad (2.4.2.9d)$$

$$B_{ss4} = \mu_o H_{ts4i} \quad (2.4.2.9e)$$

Equation 2.4.2.6 can be rewritten in terms of flux densities as follows:

$$B_g \tau_{ss} L_1 = B_{ts} w_{ts} L_1 + B_{ss} w_{ss} L_1 \quad (2.4.2.10)$$

The net air gap flux density corrected for radial slot flux is then $$B_g = \frac{1}{\tau_{ss}} [B_{ts} w_{ts} + B_{ss} w_{ss}] \quad (2.4.2.11)$$

For unsaturated teeth, $$B_{ss} \ll B_{ts} \quad (2.4.2.12)$$

and $$B_b \cong B_{gi} \quad (2.4.2.13)$$

When heavily saturated, however, the slot flux can be significant.

Figure 11:
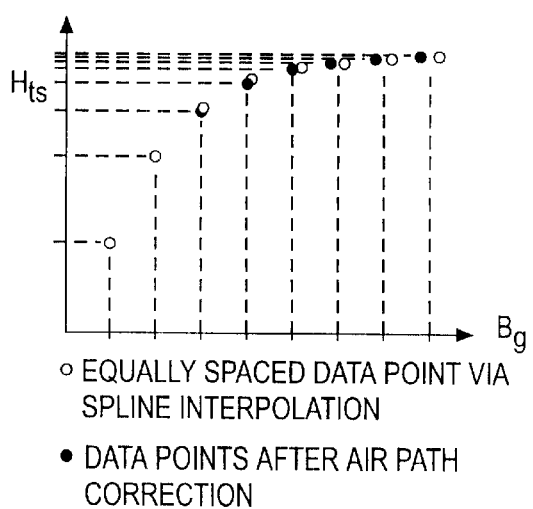
FIG. 11 depicts an illustration of data point correction via spline interpolation that may be used by the system of FIG. 1.

The field intensity at each defined position along the tooth must be calculated for a given set of gap flux densities forming an effective B-H curve for the tooth and slot. Due to the radial slot flux correction, the air gap flux densities calculated at each point along the tooth are not equally spaced. Spline functions may be used to interpolate field intensity curves (e.g., FIG. 11) to the same air gap flux density curve with equally space points at each tooth section; i.e., $$H_{ts0} = f_{spline}(B_{gi}, H_{ts0i}, B_g) \quad (2.4.2.14a)$$

$$H_{ts1} = f_{spline}(B_{gi}, H_{ts1i}, B_g) \quad (2.4.2.14b)$$

$$H_{ts2} = f_{spline}(B_{gi}, H_{ts2i}, B_g) \quad (2.4.2.14c)$$

$$H_{ts3} = f_{spline}(B_{gi}, H_{ts3i}, B_g) \quad (2.4.2.14d)$$

$$H_{ts4} = f_{spline}(B_{gi}, H_{ts4i}, B_g) \quad (2.4.2.14e)$$

A correction for slot leakage flux may also be made. Slot leakage flux caused by loading affects the effective magnetizing inductance in two ways; the flux per poles in the stator, air gap, and rotor differ, and the effective slot openings are increased.

During no load operating conditions, the magnetizing, stator, and rotor flux are all nearly equal. As an induction machine becomes loaded under a fixed terminal voltage, induced rotor currents buck flux such that the rotor flux is attenuated. The stator flux remains nearly unchanged because the terminal voltage is fixed. The magnetizing (i.e., air gap) flux is also attenuated but not as much as the rotor flux.

Tooth slot leakage factors that are operating point dependent can be introduced to account for the flux variations in the stator, rotor, and air gap. Equations 2.4.2.15a–e show the addition of stator tooth slot leakage factors on original equations 2.4.2.7a–e.

$$B_{ts0} = \frac{\tau_{ss0}}{w_{ts0}} B_{gi} k_{st\_leak0} \quad (2.4.2.15a)$$

$$B_{ts1} = \frac{\tau_{ss0}}{w_{ts1}} B_{gi} k_{st\_leak1} \quad (2.4.2.15b)$$

$$B_{ts2} = \frac{\tau_{ss0}}{w_{ts2}} B_{gi} k_{st\_leak2} \quad (2.4.2.15c)$$

$$B_{ts3} = \frac{\tau_{ss0}}{w_{ts3}} B_{gi} k_{st\_leak3} \quad (2.4.2.15d)$$

$$B_{ts4} = \frac{\tau_{ss0}}{w_{ts4}} B_{gi} k_{st\_leak4} \quad (2.4.2.15e)$$

Localized saturation of tooth edges near the air gap cause the effective slot opening widths to increase, especially with rotor slot bridges. As a result, the effective air gap length as calculated via Carter coefficients increases, thereby decreasing the effective magnetizing inductance. To account for this effect, the Carter coefficients must be recalculated for each operating point using effective slot opening widths for the stator and rotor ($w_{ss0}$ and $W_{sr0}$, respectively).

Tooth MMF will be considered next. The net tooth MMF drop for each gap flux density value, $B_g$, and each tooth is calculated via the trapezoidal rule.

$$MMF_{tsi} = \tfrac{1}{2}(H_{ts0} + H_{ts1})d_{ts01} + (H_{ts1} + H_{ts2})d_{ts12} + (H_{ts2} H_{ts3})d_{ts23} + (H_{ts3} + H_{ts4})d_{ts34} \quad (2.4.2.16)$$

Rotor teeth MMF will be considered next. The MMF drop across the rotor teeth are calculated in the same manner as the stator teeth. Since the rotor teeth are almost always identical, the procedure can usually be calculated for one tooth only.

The net teeth plus gap MMF will be considered next. For asymmetrical laminations consisting of non-uniform stator or rotor teeth, the MMF drops must be calculated for each tooth. Since the stator and rotor teeth MMF drops are calculated on a per tooth/slot basis, and the number of stator and rotor teeth are never the same, spline interpolations may be used to create curves of equally spaced angular positions; i.e., $$MMF_{ts} = f_{spline}(\theta_{ts\_vec}, MMF_{tsi}, \theta_{g\_vec}) \quad (2.4.2.17)$$

$$MMF_{tr} = f_{spline}(\theta_{tr\_vec}, MMF_{tri}, \theta_{g\_vec}) \quad (2.4.2.18)$$

Because a FFT (Fast Fourier Transform) is later utilized to calculate the harmonic components in the air gap flux density spatial distribution, the number of equally spaced angular positions is chosen to be a power of 2, preferably such that the number of points is greater than the number of stator and rotor teeth.

The combined stator and rotor teeth MMF and air gap MMF for a given angular position then becomes $$MMF_{gt} = MMF_g + MMF_{ts} + MMF_{tr} \quad (2.4.2.19)$$

Figure 12:
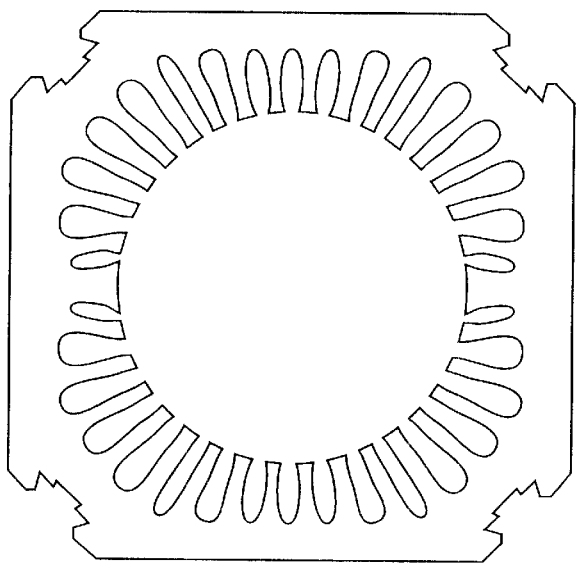
FIG 12 depicts an asymmetrical stator lamination requiring modeling of individual teeth that may be modeled by the system of FIG. 1.
Figure 13:
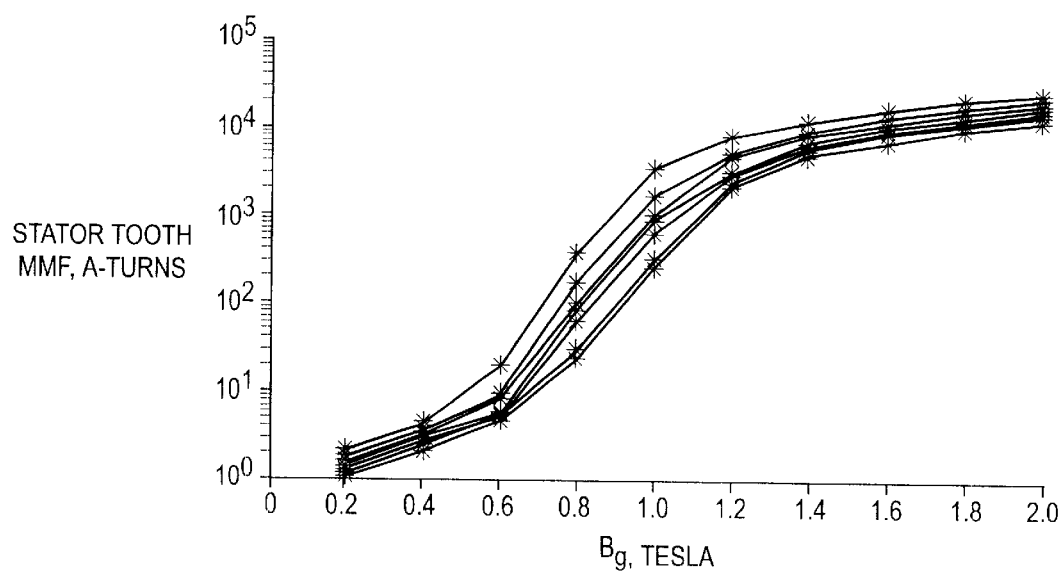
FIG. 13 depicts stator tooth MMF versus air gap flux density for each tooth of the asymmetrical stator lamination in FIG. 12 that may be modeled by the system of FIG. 1.
Figure 14:
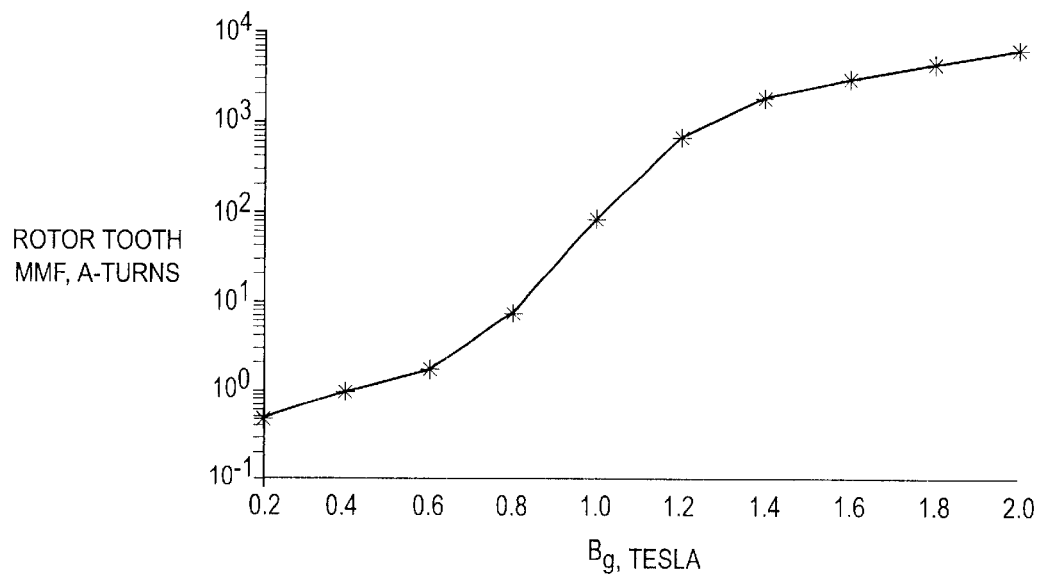
FIG. 14 depicts typical rotor tooth MMF versus air gap flux density for a symmetrical rotor lamination that may be modeled by the system of FIG. 1.
Figure 15:
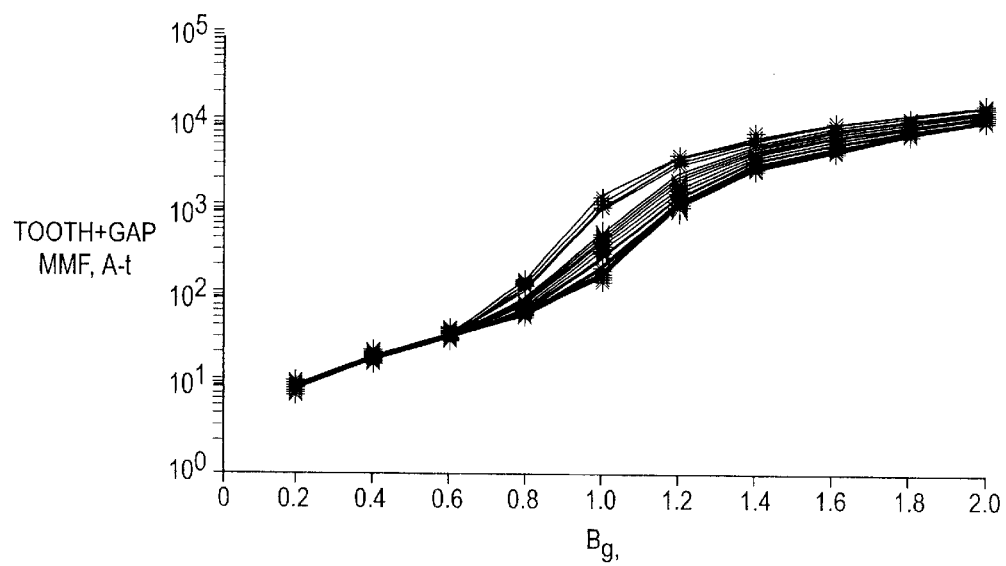
FIG. 15 depicts combined air gap and teeth MMF versus air gap flux density curves at equally spaced angular positions along the air gap obtained from the curves of FIGS. 13 and 14 that may be used by the system of FIG. 1.

For a machine with asymmetrical stator laminations but symmetrical rotor laminations, such as in FIG. 12, the final result is a series of curves as shown in FIG. 13. FIG. 13 shows stator tooth MMF vs air gap flux density for each tooth of the asymmetrical stator lamination of FIG. 12. The corresponding rotor tooth and the combined stator, rotor, and gap MMF curves are shown in FIGS. 14 and 15, respectively. FIG. 14 shows a typical rotor tooth MMF vs air gap flux density for a symmetrical rotor lamination. FIG. 15 shows a combined air gap and teeth MMF versus air gap flux density curves at equally spaced angular positions along the air gap obtained from the curves in FIGS. 13 and 14.

Figure 16:
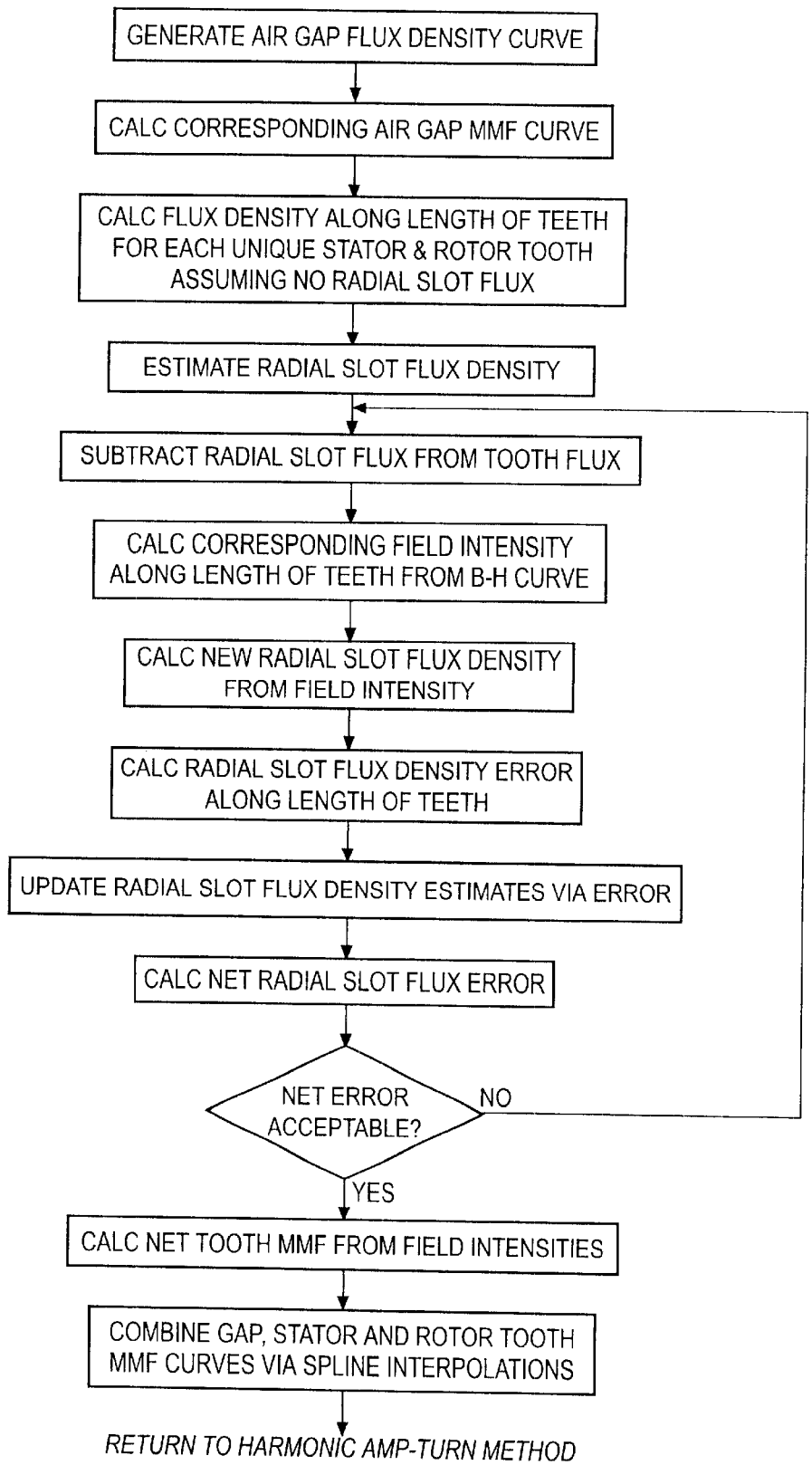
FIG. 16 is a flowchart illustrating an iterative method of pre-calculating the combined air gap and stator and rotor tooth MMF as a function of air gap flux density and angular position that may be used by the system of FIG. 1

An iterative method will be discussed next. An alternative method to correct for radial slot flux is via an iterative approach as indicated by the flowchart in FIG. 16. FIG. 16 illustrates an iterative method of pre-calculating the combined air gap and stator and rotor tooth MMF as a function of air gap flux density and angular position.

The iterative method has the advantage of simplified coding and less dependency on spline interpolations. The potential for convergence problems is a disadvantage, although the method is stable with proper update gain selection and realistic tooth dimensions.

Stator yoke flux and MMF spatial distribution will be consider next. The stator yoke flux density spatial distribution is constructed of individual space harmonics. The effective yoke cross-section is calculated including the effective frame cross-section.

Figure 20:
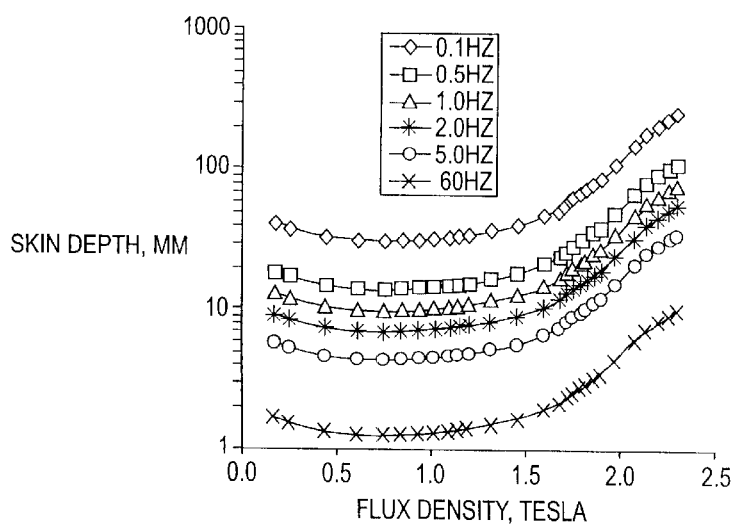
FIG. 20 depicts skin depth as a function of flux density that may be used by the system of FIG. 1.
Figure 21:
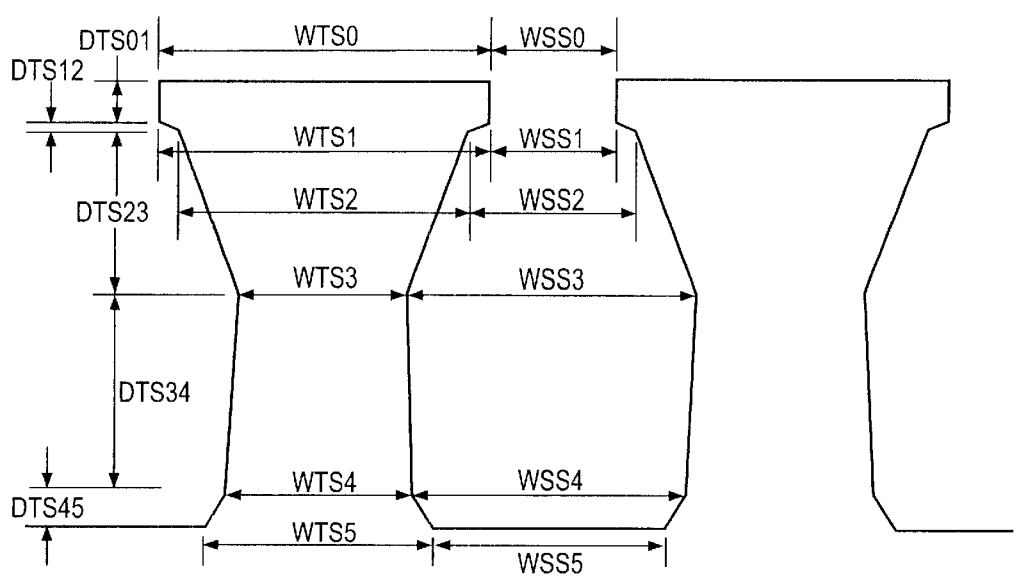
FIG. 21 depicts a typical stator tooth and slot geometry with dimensioning that may be moldeled by the system of FIG. 1.

Modeling of the stator frame will be considered first. Flux penetration into the stator frame is dependent upon the skin depth, which in turn is dependent upon the material permeability, resistivity (and temperature), and slip frequency. The skin depth is given by $$d_{skin\_frame} = \sqrt{\frac{\rho_{frame}}{f_{stator}\mu_{frame}\pi}} \quad (2.5.1.1)$$

where $\rho_{frame}$=frame material resistivity and $\mu_{frame}$=frame permeability The frame skin depth can be calculated at a particular operating point from the frame material B-H curve, temperature, and stator excitation frequency. FIG. 20 shows the skin depth for GE material B2A1B2 (cast iron) at 25C.

Skin depth as a function of flux density will be considered next. The effective rotor shaft magnetic thickness is approximated as being of one skin depth thickness with uniform flux density. Thus $$d_{shaft\_eff} = d_{skin\_shaft} = \sqrt{\frac{\rho_{shaft}}{f_{slip}\mu_{shaft}\pi}} \quad (2.5.3.2)$$

The effective shaft thickness is continuously recalculated for each rotor slot and at each operating point to account for variations in slip frequency, temperature, and flux density amplitude and angular position.

Stator yoke flux density will be considered next. The flux density behind each stator slot, m, (averaged over each slot pitch) contributed by the flux harmonic, h, is $$B_{ys_{m,h}} = -(\varphi_{pka_h} k_{ys\_leak\_a_h} \sin(h\theta_m) + \varphi_{pkb_h} k_{ys\_leak\_b_h} \cos(h\theta_m)) \frac{2}{A_{ys_m}} \quad (2.5.1.1)$$

where $\theta_m$ is the angular position of stator slot m.

A stator yoke leakage factor is defined to correct for increased leakage flux in the stator yoke during loaded operating conditions, and is equal to the ratio of magnetizing flux to stator yoke flux; i.e., $$k_{ys\_leak\_a_h} = \frac{\varphi_{pka_h}}{\varphi_{pk\_ys\_a_h}} \quad (2.5.1.2a)$$

$$k_{ys\_leak\_b_h} = \frac{\varphi_{pkb_h}}{\varphi_{pk\_ys\_b_h}} \quad (2.5.1.2b)$$

Variations in the stator yoke are handled by distinct yoke cross-sections, $A_{ys_m}$, averaged over each slot pitch. Correction for axial ducts or vents is also included, as given in equation 2.5.1.3.

$$A_{ys_m} = (d_{ys\_ave_m} - d_{s\_duct\_eff_m})L_1 \quad (2.5.1.3)$$

The net stator yoke flux density behind each stator slot is the summation of harmonic components:

$$B_{ys_m} = {}_hB_{ys_{m,h}} \quad (2.5.1.4)$$

Statory yoke flux density and MMF Distribution will be considered next. The corresponding field intensity behind each stator slot is $$H_{ys_m} = f_{BH_{stator}}(B_{ys_m}) \quad (2.5.2.1)$$

The MMF distribution is obtained via integration of the field intensity. Since the field intensity is calculated at each slot, the trapezoidal rule is used for approximation of the integration. The MMF at each slot, m, is then $$MMF_{ys0_m} = \tfrac{1}{2}{}^m{}_{i=2}(H_{ys_{i-1}}l_{ys_{i-1}} + H_{ys_i}l_{ys_i}) \quad (2.5.2.2)$$

Since the initial integration point is not pre-determined, an erroneous dc offset is usually present in the MMF distribution calculated from equation 2.5.2.2. The dc offset is removed via subtraction of the mean; i.e., $$MMF_{ys_m} = MMF_{ys0_m} - MMF_{ys_{mean}} \quad (2.5.2.3)$$

Correction is also required for slot leakage. The MMF (as calculated) is the MMF producing both magnetizing and stator slot leakage flux in the stator yoke. The desired MMF for magnetizing saturation calculation is the magnetizing component only, which is calculated via a stator yoke leakage factor, $k_{ys\_leak}$. This correction assumes a linear MMF relationship, and is thus not precisely correct, but the slot leakage MMF component is generally small enough such that the error should not be significant. The MMF distribution thus becomes:

$$MMF_{ys_m} = \frac{MMF_{ys_m}}{k_{ys\_leak}} \qquad (2.5.2.4)$$

To avoid over complication, the stator yoke leakage factor can be approximated from the average of the fundamental stator yoke leakage factors defined in equations 2.5.1.2a–b. The leakage factor can be approximated as follows:

$$k_{ys\_leak} = \tfrac{1}{2}(k_{ys\_leak\_a_1} + k_{ys\_leak\_b_1}) \qquad (2.5.2.5)$$

A spline function is again used to interpolate the yoke MMF distribution with calculation points at each stator slot to a curve of equally spaced points defined for the air gap distribution; i.e., $$MMF_{ys} = f_{spline}(\theta_{ys\_vec}, MMF_{ysi}, \theta_{g\_vec}) \qquad (2.5.2.6)$$

Rotor yoke flux and MMF spatial distribution will be considered next. The rotor yoke flux density spatial distribution is calculated in a similar manner as the stator yoke. A minor complication is the necessity of the calculation of MMF for rotors with asymmetries such as axial vents or ducts during steady state operation and the rotor spinning. The flux density, field intensity, and MMF spatial distributions are calculated and averaged over several rotor positions spanning the period of the asymmetry.

Figure 17:
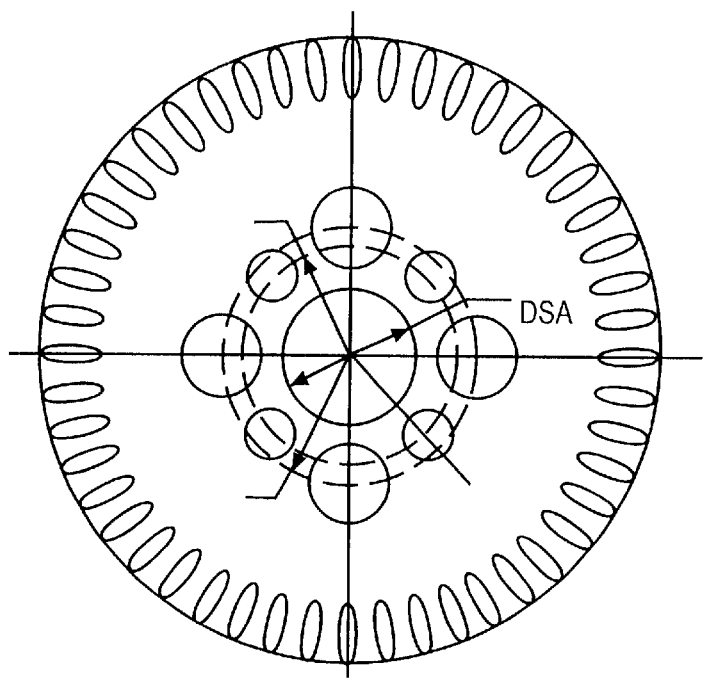
FIG. 17 depicts rotor laminations for a single phase motor with axial vents that may be modeled by the system of FIG. 1.
Figure 18:
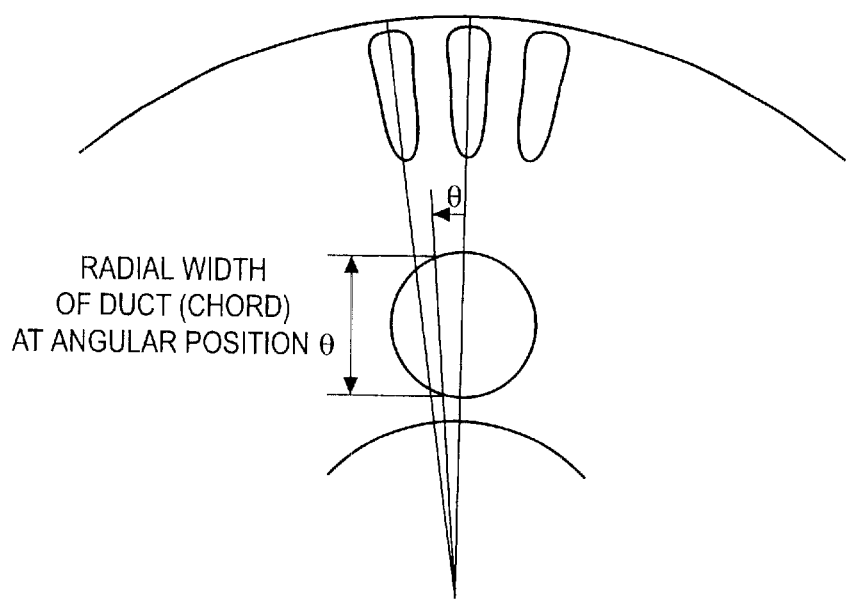
FIG. 18 depicts a calculation of effective radial width of axial ducts that may be used by the system of FIG. 1.
Figure 19A:
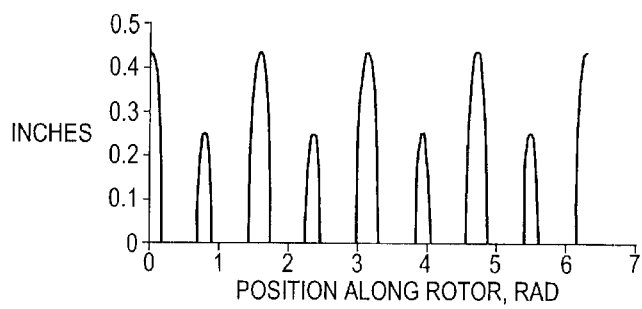
FIGS. 19A–19C depicts modeled elements of the axial vent holes in the rotor yoke of FIG. 18 that may be used by the system of FIG. 1.
Figure 19B:
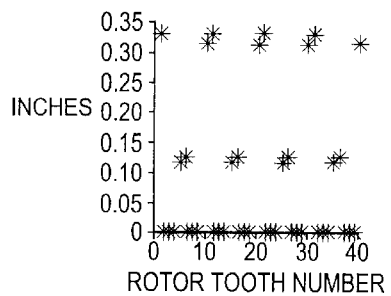
Figure 19C:
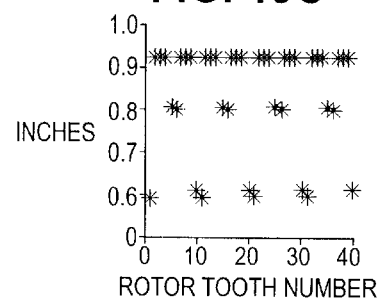

The modeling of axial ducts will be considered next. The impact of axial vents or ducts (as shown in FIG. 17) are accommodated by adjusting the effective width of the rotor yoke. The effective width of the axial ducts are averaged over each slot pitch by taking radial chord slices as shown in FIG. 18. Effective rotor yoke widths are then calculated and averaged over each rotor slot pitch as illustrated in FIG. 19.

The modeling of a rotor shaft will be considered next. Flux penetration into the rotor shaft is dependent upon the skin depth, which in turn is dependent upon the material permeability, resistivity (and temperature), and slip frequency. The skin depth is given by $$d_{skin\_shaft} = \sqrt{\frac{\rho_{shaft}}{f_{slip}\mu_{shaft}\pi}} \qquad (2.5.3.1)$$

where $\rho_{shaft}$=shaft material resistivity and
$\mu_{shaft}$=shaft permeability.

The rotor shaft skin depth can be calculated at a particular operating point from the shaft material B-H curve, temperature, and slip frequency. FIG. 20 shows the skin depth for GE steel B4C1B at 25C, which is a medium carbon steel bar used for rotor shafts.

The effective rotor shaft magnetic thickness is approximated as being of one skin depth thickness with uniform flux density. Thus $$d_{shaft\_eff} = d_{skin\_shaft} = \sqrt{\frac{\rho_{shaft}}{f_{slip}\mu_{shaft}\pi}} \qquad (2.5.3.2)$$

The effective shaft thickness is continuously recalculated for each rotor slot and at each operating point to account for variations in slip frequency, temperature, and flux density amplitude and angular position.

Rotor yoke flux density and MMF will be considered next. The contribution of each flux harmonic to the yoke flux density behind each rotor slot pitch is $$B_{yr_{n,h}} = -(\varphi_{pka_h} k_{yr\_leak\_a_h} \sin(h\theta_n) + \qquad (2.5.3.3)$$
$$\varphi_{pkb_h} k_{yr\_leak\_b_h} \cos(h\theta_n))\frac{2}{A_{yr_n}}$$

where $\theta_n$ is the position of the rotor slot n relative to the stator, and $A_{yr_n}$ is the effective rotor yoke cross-section;

$$A_{yr_n} = (d_{yr_n} - d_{duct\_eff_n} - d_{shaft\_eff_n})L_2. \qquad (2.5.3.4)$$

The net rotor yoke flux density behind each rotor slot is:

$$B_{yr_n} = {}_hB_{yr_{n,h}}. \qquad (2.5.3.5)$$

The corresponding field intensity behind each slot is $$H_{yr_n} = f_{BH_{rotor}}(B_{yr_n}). \qquad (2.5.3.6)$$

The MMF at each slot, n, is then $$MMF_{yr0_n} = \tfrac{1}{2}{}^n_{i=2}(H_{yr_{i-1}}l_{yr_{i-1}} + H_{yr_i}l_{yr_i}) \qquad (2.5.3.7)$$

The dc offset is removed via subtraction of the mean; i.e., $$MMF_{yr_n} = MMF_{yr0_n} - MMF_{yr_{mean}}. \qquad (2.5.3.8)$$

The magnetizing component of the MMF is then $$MMF_{yr_{Rn}} = \frac{MMF_{yr_n}}{k_{rm\_leak}}. \qquad (2.5.3.9)$$

A spline function is again used to interpolate the yoke MMF distribution with calculation points at each rotor slot to enter a curve of equally spaced points defined for the air gap distribution; i.e., $$MMF_{yrG} = f_{spline}(\theta_{yr\_vec}, MMF_{yr_R}, \theta_{g\_vec}. \qquad (2.5.3.10)$$

The magnetizing MMF inner loop will be considered next. As a first step, the magnetizing MMF spatial distribution is considered. The magnetizing MMF at each angular position, $\theta_g$, defined in the air gap is the sum of each harmonic component, h;

$$MMF_{mag_{g,h}} = MMF_{mag\_pk\_a_h} \sin(h\theta_g) +$$
$$MMF_{mag\_pk\_b_h} \cos(h\theta_g) \qquad (2.6.1.1)$$

$$MMF_{mag_{g,h}} = {}^{Nh}_{h=1} MMF_{mag_{g,h}} \qquad (2.6.1.2)$$

where Nh is the maximum number of MMF harmonics contained in the two-axis motor model. The relative amplitudes and phases of these harmonic MMFs are defined by the stator winding distribution. There is the inherent assumption that the rotor windings have identical effective distributions.

$$MMF_{mag\_pk_h} = k_{w_h} MMF_{mag\_pk_{fund}} \qquad (2.6.1.3)$$

Note both high order harmonics and sub-harmonics relative to the fundamental can be modeled.

Next, the air gap and tooth MMF spatial distribution is considered. From the stator and rotor yoke MMF distributions calculated in equation 2.5.2.6 and 2.5.3.10 and the estimated magnetizing MMF distribution in equation 2.6.1.2, the combined air gap and tooth (stator and rotor) MMF distribution is obtained as follows $$MMF_{gt_g} = MMF_{mag_g} - MMF_{ys_g} - MMF_{yr_g} \qquad (2.6.2.1)$$

The air gap and tooth flux density spatial distribution will now be considered. The flux density at each angular position within the air gap is interpolated from the pre-calculated air gap and tooth MMF curves given by equation 2.6.2.1; i.e., $$B_{g_g} = f_{interp}(MMF_{g t_g}, B_{g\_curve}, MMF_{gt\_curve}) \quad (2.6.3.1)$$

The air gap flux density spatial distribution is decomposed into new spectral (harmonic inc. fundamental) components via an FFT procedure using the equation as follows;

$$\vec{B}_{g\_pk\_new_h} = f_{FFT}(B_g) \quad (2.6.3.2)$$

The spectrum is separated into quadrature components;

$$B_{g\_pk\_new\_a_h} = \text{Real}(\vec{B}_{g\_pk\_new_h}) \quad (2.6.3.3a)$$

$$B_{g\_pk\_new\_b_h} = \text{Imag}(\vec{B}_{g\_pk\_new_h}) \quad (2.6.3.3b)$$

The new and original harmonic components are compared and an error function created as follows;

$$B_{g\_error\_a_h} = B_{g\_pk\_a_h} - B_{g\_pk\_new\_a_h} \quad (2.6.3.4a)$$

$$B_{g\_error\_b_h} = B_{g\_pk\_b_h} - B_{g\_pk\_new\_b_h} \quad (2.6.3.4b)$$

The magnetizing MMF harmonic estimates are updated via a simple relaxation scheme (equivalent to an integral gain action in a closed-loop controller) as follows;

$$MMF_{mag\_pk\_a_h} = MMF_{mag\_pk\_a_h} + K_{MMF\_gain} B_{g\_error\_a_h} \quad (2.6.3.5a)$$

$$MMF_{mag\_pk\_b_h} = MMF_{mag\_pk\_b_h} + K_{MMF\_gain} B_{g\_error\_b_h} \quad (2.6.3.5b)$$

To establish whether adequate convergence has occurred, a net flux density error is created via summation of equations 2.6.3.4a–b for each harmonic;

$$B_{g\_error\_sum} = \sum_{h=1}^{N_h} [|B_{g\_error\_a_h}| + |B_{g\_error\_b_h}|] \quad (2.6.3.6)$$

The procedure repeats as shown by the inner loop in the flowchart in FIG. 7 until $B_{g\_error\_sum}$ is within established limits.

The harmonic flux middle loop will be considered next. New estimates of the flux per pole harmonic components are calculated from the new air gap flux density harmonics as follows;

$$\varphi_{pk\_new\_a_h} = \frac{2}{\pi} \frac{A_{g2P}}{h} B_{g\_pk\_new\_a_h} \text{ and} \quad (2.7.1.1a)$$

$$\varphi_{pk\_new\_b_h} = \frac{2}{\pi} \frac{A_{g2P}}{h} B_{g\_pk\_new\_b_h}. \quad (2.7.1.1b)$$

$A_{g2P}$ is the airgap surface area for a 2 pole field (h=1) and has the form as follows;

$$A_{g2P} = r_g \pi \frac{L_1 + L_2}{2}. \quad (2.7.1.2)$$

The term $r_g$ is the average air gap radius and has the form as follows;

$$r_g = \frac{ID_1 + OD_2}{4}. \quad (2.7.1.3)$$

The change in flux is calculated from the previous estimate for each harmonic and has the form;

$$\phi_{delta\_a_h} = \phi_{pk\_a_h} - \phi_{pk\_new\_a_h} \text{ and} \quad (2.7.1.4a)$$

$$\phi_{delta\_b_h} = \phi_{pk\_b_h} - \phi_{pk\_new\_b_h} \quad (2.7.1.4b)$$

A simple relaxation method is again used to update new estimates for the flux per pole harmonic components as follows;

$$\phi_{pk\_a_h} = \phi_{pk\_a_h} - k_{\phi\_gain} \phi_{delta\_a_h} \quad (2.7.1.5a)$$

$$\phi_{pk\_b_h} = \phi_{pk\_b_h} - k_{\phi\_gain} \phi_{delta\_b_h} \quad (2.7.1.5b)$$

Convergence is determined based upon a net delta as follows;

$$\varphi_{delta\_net} = \sum_{h=1}^{N_{fft}} [|\varphi_{delta\_a_h}| + |\varphi_{delta\_b_h}|] \quad (2.7.1.6)$$

Note that the flux per pole harmonics are calculated and updated for each harmonic obtained from the FFT, and is thus not limited to the harmonics included in the two-axis (or other) motor model solver.

Saturation factors for the two-axis circuit model will be considered next. Saturation factors for each harmonic included in the two-axis motor model is calculated from the ratio of gap MMF to magnetizing MMF as given by equations 2.8.1a–b.

$$K_{sat\_a_h} = \frac{MMF_{gap\_a_h}}{MMF_{mag\_pk\_a_h}} \quad (2.8.1.a)$$

$$K_{sat\_b_h} = \frac{MMF_{gap\_b_h}}{MMF_{mag\_pk\_b_h}} \quad (2.8.1.b)$$

The MMF drop across the air gap is calculated for each harmonic from the respective air gap flux density harmonic. A mean effective air gap length is used when variations in the effective gap length exist as calculated from Carter factors.

$$MMF_{gap\_a_h} = \frac{g_{eff\_ave}}{\mu_o} B_{g\_pk\_new\_a_h} \quad (2.8.2a)$$

$$MMF_{gap\_b_h} = \frac{g_{eff\_ave}}{\mu_o} B_{g\_pk\_new\_b_h} \quad (2.8.2b)$$

As indicated in the flowchart in FIG. 2, separate saturation factors are calculated for the major and minor axes (except under balanced polyphase operation in polyphase motors). Thus up to a total of four distinct saturation factors may be calculated.

The saturation factors that have been calculated up to this point apply to the major and minor axes of the ellipse, but it is necessary to produce factors that can be applied to the d and q reactances of the two-axis model. An appropriate procedure may be to compute the square root of the sum of the squares of the projections of the ellipse defined saturation factors onto the d-q axes. Recalling that the angle ψ defines the angle between the major axis of the ellipse and the q axis, the calculation produces for d-q saturation factors the expression as follows:

$$K_{sat,q} = \sqrt{(K_{sat,major} \cos\psi)^2 + (K_{sat,minor} \sin\psi)^2} \quad (2.8.3a)$$

$$K_{sat,d} = \sqrt{(K_{sat,major} \sin\psi)^2 + (K_{sat,minor} \cos\psi)^2} \quad (2.8.3b)$$

Note that for a symmetrical machine with balanced excitation, $K_{sat,major}$ equals $K_{sat,minor}$, yielding $K_{sat,q}=K_{sat,d}$ Magnetizing current and inductance calculations will be considered next. First, a magnetizing current is considered. From the magnetizing MMF (ampere turns per pole), the fundamental magnetization current (peak amperes) can be calculated as follows:

$$i_{ma} = \frac{1}{K_{a_f}} MMF_{\text{mag\_pk\_af}} \quad (2.9.1a)$$

$$i_{mb} = \frac{1}{K_{b_f}} MMF_{\text{mag\_pk\_bf}}, \quad (2.9.1b)$$

where the winding coefficients are defined by the expressions $$K_{a_h} = \frac{K_{pa} K_{da} N_{as_h} q}{\pi h} \text{ and} \quad (2.9.2a)$$

$$K_{b_h} = \frac{K_{pb} K_{db} N_{bs_h} q}{\pi h} \quad (2.9.2b)$$

and where $N_{as_h}$=total series turns per phase for each harmonic h, a-axis, $N_{bs_h}$=total series turns per phase for each harmonic h, b-axis, $K_{pa_h}$=winding pitch factor for each harmonic h, a-axis, $K_{pb_h}$=winding pitch factor for each harmonic h, b-axis, $K_{da_h}$=winding distribution factor for each harmonic h, a-axis, $K_{db_h}$=winding distribution factor for each harmonic h, b-axis, q=number of phases and h=harmonic number (number of pole pairs for fundamental component). Note that for a single-phase motor, which is really an unbalanced two-phase machine, q=2.

Magnetizing inductance will be considered next. The magnetizing inductance for each harmonic can be calculated as follows $$L_{ma_h} = \frac{\lambda}{i} \quad (2.9.3a)$$

$$= \frac{K_{pa} K_{da} N_{as_h} \varphi_{a_h}}{i}$$

$$= \frac{K_{pa} K_{da} N_{as_h} \varphi_{a_h}}{K_{a_h} MMF_{a_h}}$$

Rearranging terms produces the expression as follows;

$$L_{ma_h} = \frac{q(K_{pa} K_{da} N_{as_h})^2}{\pi h} \frac{\varphi_{a_h}}{MMF_{a_h}} \quad (2.9.3b)$$

$$L_{ma_h} = \frac{\pi h K_a^2}{q} \frac{\varphi_{a_h}}{MMF_{a_h}} \quad (2.9.3c)$$

$$L_{mb_h} = \frac{\pi h K_b^2}{q} \frac{\varphi_{b_h}}{MMF_{b_h}} \quad (2.9.3d)$$

where $\varphi_{a_h}$=flux per pole for each harmonic h, a-axis, webers and $\varphi_{b_h}$=flux per pole for each harmonic h, b-axis, webers.

A specific embodiment of a method and apparatus for motor modeling using harmonic a harmonic ampere-turn saturation method has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of modeling an electric motor comprising the steps of:
    interpolating a flux density for each angular position within an air gap of the electric motor from a predetermined air gap and tooth magnetization magnetomotive force versus air gap flux density curve;
    decomposing the interpolated flux density into a set of harmonic components using a fast Fourier transform; and
    determining a flux density error function from the decomposed set of harmonic components.

2. The method of modeling the electric motor as in claim 1 wherein the step of interpolating the flux density further comprises calculating an air gap and tooth magnetization magnetomotive force for entering the air gap and tooth magnetization magnetomotive force versus gap flux density curve by subtracting a stator yoke magnetomotive force and a rotor yoke magnetomotive force from an estimated magnetizing magnetomotive force.

3. The method of modeling the electric motor as in claim 2 wherein the step of determining the flux density error function further comprises separating the decomposed set of harmonic components into a pair of quadrature components for each harmonic.

4. The method of modeling the electric motor as in claim 3 wherein the step of determining the error function further comprises comparing the pair of quadrature components of each harmonic with a corresponding pair of quadrature components of a previous iteration to produce the flux density error function in the form of a pair of quadrature components for each harmonic.

5. The method of modeling the electric motor as in claim 4 further comprising multiplying the quadrature components of each harmonic of the error function by a proportioning constant.

6. The method of modeling the electric motor as in claim 5 further comprising updating the estimated magnetizing magnetomotive force by adding the product of the multiplied quadrature components of each harmonic of the error function to a corresponding quadrature component for each harmonic of the estimated magnetizing magnetomotive force.

7. The method of modeling the electric motor as in claim 6 further comprising iterating a new error function by interpolating a new flux density for each angular position within an air gap of the electric motor using the new estimated magnetizing magnetomotive force and the precalculated air gap and tooth magnetization magnetomotive force versus gap flux density curve.

8. The method of modeling the electric motor as in claim 3 further comprising summing the pair of quadrature components of each harmonic of the error function to produce a flux density error sum.

9. The method of modeling the electric motor as in claim 8 further comprising comparing the flux density error sum with a threshold error value and when the flux density error sum exceeds the threshold error value, terminating an iteration of the interpolation of the flux density.

10. The method of modeling the electric motor as in claim 3 further comprising calculating quadrature components for each harmonic of a flux per pole from the separated pair of quadrature components for each harmonic.

11. The method of modeling the electric motor as in claim 10 further comprising calculating a new stator yoke magnetomotive force and a new rotor yoke magnetomotive force from the calculated quadrature components of the flux per pole.

12. The method of modeling the electric motor as in claim 11 further comprising calculating a new air gap and tooth magnetizing magnetmotive force from the new stator yoke magnetomotive force and the new rotor yoke magnetomotive force.

13. The method of modeling the electric motor as in claim 12 further comprising determining a flux per pole error function by comparing the pair of quadrature components of each harmonic of the flux per pole with a corresponding pair of quadrature components of flux per pole of a previous iteration to produce a flux per pole error function in the form of a pair of quadrature components for each harmonic.

14. The method of modeling the electric motor as in claim 13 further comprising multiplying the quadrature components of each harmonic of the flux per pole error function by a proportioning constant.

15. The method of modeling the electric motor as in claim 14 further comprising updating the quadrature components of the flux per pole by adding the product of the multiplied quadrature components of each harmonic of the flux per pole error function to a corresponding quadrature component of each harmonic of a flux per pole of a previous iteration.

16. The method of modeling the electric motor as in claim 1 further comprising summing the pair of quadrature components of each harmonic of the flux per pole error function to produce an flux per pole error sum.

17. The method of modeling the electric motor as in claim 16 further comprising comparing the flux per pole error sum with a threshold flux per pole error value and when the flux per pole error sum exceeds the threshold flux per pole error value, terminating the iteration of the interpolation of the flux per pole.

18. An apparatus for modeling an electric motor comprising:
means for interpolating a flux density for each angular position within an air gap of the electric motor from a predetermined air gap and tooth magnetization magnetomotive force versus air gap flux density curve;
means for decomposing the interpolated flux density into a set of harmonic components using a fast Fourier transform; and
means for determining a flux density error function from the decomposed set of harmonic components.

19. The apparatus for modeling the electric motor as in claim 18 wherein the means for interpolating the flux density further comprises means for calculating an air gap and tooth magnetization magnetomotive force for entering the air gap and tooth magnetization magnetomotive force versus gap flux density curve by subtracting a stator yoke magnetomotive force and a rotor yoke magnetomotive force from an estimated magnetizing magnetomotive force.

20. The apparatus for modeling the electric motor as in claim 18 wherein the means for determining the flux density error function further comprises means for separating the decomposed set of harmonic components into a pair of quadrature components for each harmonic.

21. The apparatus for modeling the electric motor as in claim 20 wherein the means for determining the error function further comprises means for comparing the pair of quadrature components of each harmonic with a corresponding pair of quadrature components of a previous iteration to produce the flux density error function in the form of a pair of quadrature components for each harmonic.

22. The apparatus for modeling the electric motor as in claim 21 further comprising means for multiplying the quadrature components of each harmonic of the error function by a proportioning constant.

23. The apparatus for modeling the electric motor as in claim 22 further comprising means for updating the estimated magnetizing magnetomotive force by adding the product of the multiplied quadrature components of each harmonic of the error function to a corresponding quadrature component for each harmonic of the estimated magnetizing magnetomotive force.

24. The apparatus for modeling the electric motor as in claim 23 further comprising means for iterating a new error function by interpolating a new flux density for each angular position within an air gap of the electric motor using the new estimated magnetizing magnetomotive force and the precalculated air gap and tooth magnetization magnetomotive force versus gap flux density curve.

25. The apparatus for modeling the electric motor as in claim 24 further comprising means for summing the pair of quadrature components of each harmonic of the error function to produce a flux density error sum.

26. The apparatus for modeling the electric motor as in claim 25 further comprising means for comparing the flux density error sum with a threshold error value and when the flux density error sum exceeds the threshold error value, terminating an iteration of the interpolation of the flux density.

27. The apparatus for modeling the electric motor as in claim 20 further comprising means for calculating quadrature components for each harmonic of a flux per pole from the separated pair of quadrature components for each harmonic.

28. The apparatus for modeling the electric motor as in claim 27 further comprising means for calculating a new stator yoke magnetomotive force and a new rotor yoke magnetomotive force from the calculated quadrature components of the flux per pole.

29. The apparatus for modeling the electric motor as in claim 28 further comprising means for calculating a new air gap and tooth magnetizing magnetmotive force from the new stator yoke magnetomotive force and the new rotor yoke magnetomotive force.

30. The apparatus for modeling the electric motor as in claim 29 further comprising means for determining a flux per pole error function by comparing the pair of quadrature components of each harmonic of the flux per pole with a corresponding pair of quadrature components of flux per pole of a previous iteration to produce a flux per pole error function in the form of a pair of quadrature components for each harmonic.

31. The apparatus for modeling the electric motor as in claim 30 further comprising means for multiplying the quadrature components of each harmonic of the flux per pole error function by a proportioning constant.

32. The apparatus for modeling the electric motor as in claim 31 further comprising means for updating the quadrature components of the flux per pole by adding the product of the multiplied quadrature components of each harmonic of the flux per pole error function to a corresponding quadrature component of each harmonic of a flux per pole of a previous iteration.

33. The apparatus for modeling the electric motor as in claim 18 further comprising means for summing the pair of quadrature components of each harmonic of the flux per pole error function to produce an flux per pole error sum.

34. The apparatus for modeling the electric motor as in claim 33 further comprising means for comparing the flux per pole error sum with a threshold flux per pole error value and when the flux per pole error sum exceeds the threshold flux per pole error value, terminating the iteration of the interpolation of the flux per pole.

35. An apparatus for modeling an electric motor comprising:

- a interpolation processor adapted to interpolate a flux density for each angular position within an air gap of the electric motor from a predetermined air gap and tooth magnetization magnetomotive force versus air gap flux density curve;
- a Fourier processor adapted to decompose the interpolated flux density into a set of harmonic components using a fast Fourier transform; and
- an error processor adapted to determine a flux density error function from the decomposed set of harmonic components.

* * * * *